US011885594B2

(12) United States Patent
Malka et al.

(10) Patent No.: US 11,885,594 B2
(45) Date of Patent: Jan. 30, 2024

(54) SYSTEM AND METHOD OF GENERATING EXPLOSIVE DEVICES FIELD MAP

(71) Applicant: 4M ANALYTICS LTD., Carmia (IL)

(72) Inventors: Itzik Malka, Neot Golan (IL); Nir Cohen, Moshav Maor (IL)

(73) Assignee: 4M ANALYTICS LTD., Carmia (IL)

( * ) Notice: Subject to any disclaimer, the term of this patent is extended or adjusted under 35 U.S.C. 154(b) by 398 days.

(21) Appl. No.: 17/416,512

(22) PCT Filed: Jun. 1, 2020

(86) PCT No.: PCT/IL2020/050606
§ 371 (c)(1),
(2) Date: Jun. 20, 2021

(87) PCT Pub. No.: WO2020/250214
PCT Pub. Date: Dec. 17, 2020

(65) Prior Publication Data
US 2022/0074713 A1    Mar. 10, 2022

(30) Foreign Application Priority Data
Jun. 12, 2019   (IL) .......................................... 267290

(51) Int. Cl.
*F41H 11/13*    (2011.01)
*F41H 11/16*    (2011.01)
(Continued)

(52) U.S. Cl.
CPC ............. *F41H 11/16* (2013.01); *F41H 11/13* (2013.01); *G01S 13/885* (2013.01); *G06F 16/29* (2019.01)

(58) Field of Classification Search
CPC ........ F41H 11/13; F41H 11/16; F41H 11/136; G01S 13/89; G01S 13/885; G06F 16/29
See application file for complete search history.

(56) References Cited

U.S. PATENT DOCUMENTS 5,307,272 A * 4/1994 Butler ...................... G01V 3/38
                                                      280/735
6,870,370 B2   3/2005 Bryan
(Continued)

FOREIGN PATENT DOCUMENTS

JP    2004239566 A    8/2004
WO   2008117291 A1   10/2008
WO   2012063241 A1    5/2012

OTHER PUBLICATIONS

Dr. Randel L. Dymond. "A GIS Model for Minefield Area Prediction: The Minefield Likelihood Procedure." Virginia Polytechnic Institute and State University, Nov. 26, 2002.
(Continued)

Primary Examiner — Jonathan C Weber
(74) Attorney, Agent, or Firm — The Roy Gross Law Firm, LLC; Roy Gross

(57) ABSTRACT

A system and a method for generating a map of an explosive devices field is disclosed. The system includes a processing device which configured to generate the map by processing and learning data receive from one or more global databases and one or more local databases and from actual data collected from the explosive devices field by an autonomous vehicle (AV). The map includes locations of subspecies areas of explosive devices which updated by the AV.

20 Claims, 5 Drawing Sheets

(51) Int. Cl.
*G06F 16/29* (2019.01)
*G01S 13/88* (2006.01)

(56) References Cited

U.S. PATENT DOCUMENTS

| | | | | |
|---|---|---|---|---|
| 7,576,681 | B2* | 8/2009 | Chen | G06F 18/256 |
| | | | | 342/52 |
| 2002/0140596 | A1 | 10/2002 | Stolarczyk et al. | |
| 2003/0136249 | A1 | 7/2003 | Inoue et al. | |
| 2011/0054689 | A1* | 3/2011 | Nielsen | G05D 1/0214 |
| | | | | 700/258 |

OTHER PUBLICATIONS

Craig Schultz. "Comparison of spatial and aspatial logistic regression models for landmine risk mapping." Applied Geography vol. 66, Jan. 2016, pp. 52-63.

Stephen R. Riese. "Estimating the Probability of Landmine Contamination." Military Operations Research vol. 11, No. 3, Special Issue: Mine Warfare (2006).

J. C.-. Chan, A. C. Alegría, M. G. Veratelli, M. Folegani and H. Sahli, "Combined spatial point pattern analysis and remote sensing for assessing landmine affected areas," 2012 IEEE International Geoscience and Remote Sensing Symposium, 2012, pp. 5368-5371, doi: 10.1109/IGARSS.2012.6352394.

Maathuis Ben, Remote Sensing based detection of landmine suspect areas and minefields, 2001 Maathuis Dec. 19, 2001 (Dec. 19, 2001).

Drones in Humanitarian Action Case Study No. 4: Deploying Drones for Spatial Modeling of Displaced Landmines in Bosnia Herzegovina, CartONG FSD, Mar. 27, 2016 Meier Mar. 27, 2016 (Mar. 27, 2016).

PCT Search Report for International Application No. PCT/IL2020/050606 dated Aug. 20, 2020, 3 pp.

PCT Written Opinion for International Application No. PCT/IL2020/050606 dated Aug. 20, 2020, 4 pp.

Search Report for corresponding Israel Application No. IL 267290 dated Nov. 28, 2019, 2 pp.

* cited by examiner

SYSTEM AND METHOD OF GENERATING EXPLOSIVE DEVICES FIELD MAP

This application is a National Phase of PCT Patent Application No. PCT/IL2020/050606 having International filing date of Jun. 1, 2020, which claims the benefit of priority of Israeli Application No. 267290 filed Jun. 12, 2019, the contents of which are all incorporated herein by reference in their entirety.

TECHNICAL FIELD

Some embodiments describe herein generally relayed to generating an explosive devices field map of an explosive devices field.

BACKGROUND

Fields of explosive devices that include for example, landmines, anti-tank mines, cluster bombs and/or unexploded ordnance.

Two common types of landmines include, for example, Anti-Personnel (AP) mines and Anti-Tank (AT) mines. AP mines are usually placed under earth, close to the surface, while AT mines are usually placed on the surface of the earth.

Fields of explosive devices prevent people from travelling freely and safely, to school, to the market, to health centers and water sources. Fields of explosive devices stop impoverished communities from being able to use their land to grow crops and earn a living. Fields of explosive devices prevent people that are displaced by war the chance to return home safely. Today, more than 60 million people are still exposed to the danger of explosive devices, e.g., landmines.

Hence, there is a need to detect and remove explosive devices to preserve human life, as well as to the development of nations and their socioeconomic stabilization security.

SUMMARY

Embodiments related to a system, a method and a product for generating a map of explosive devices field are described hereinbelow by the ways of example only.

One embodiment may include a system for generating a map of an explosive devices field comprising a processing device configured to: receive from one or more databases one or more data types, analysis the one or more global data types, the one or more static data types and the one or more dynamic data types and to generate one or more datasets based on the analysis, wherein the one or more dataset includes one or more tables comprises one or more weights of one or more sensors and the one or more tables configured to predict a probability of existence of an explosive device in one or more suspicious areas at the explosive device field based on the one or more weights; generate an initial explosive devices field map including the one or more suspicious areas classified according a level of suspicious based on the one or more datasets, wherein the level of suspicious is selected from one of a classified hazardous area (CHA) class, a suspected hazardous area (SHA) class and a none hazardous area (NHA) class, wherein the explosive devices field map includes one or more suspicious areas of explosive devices at the explosive devices field; receive from an autonomous vehicle (AV) one or more actual data collected from the one or more suspicious areas of the explosive devices field classified as CHA and SHA and generate a criterion to locate an explosive device at the one or more suspicious areas to updated the one or more tables of the one or more datasets based on the one or more actual data; and update boarders of reclassify the one or more CHA and SHA suspicious areas at the explosive field map based on the actual data and the criterion updated one or more tables.

For example, the AV comprises: a storage device to store the explosive devices field map, a navigation system to navigate the AV through the one or more suspicious areas at the explosives devices field according to a location and a class of the one or more suspicious areas at the explosive devices field map; a location sensor to provide an instantaneous location of the AV and to provide to the local database the instantaneous location of an explosive device at the explosive devices field to update boarders of the one or more suspicious areas of the explosive devices at the explosive devices field; a visual sensor to provide an image of the explosive device; a magnetic field sensor to sense metals, a hyperspectral camera to sense explosives based on a reflected emission from a ground surface, a ground penetrating radar to provide data related to the explosive devices at the explosive devices field and a data communication device to provide discover explosive data to the processing device.

For example, the one or more data types comprises the one or more global data types which comprises at least one of: environment data, administrative boundaries data, geopolitical data, population data, anthropology data, conflict zone data and time and date of the conflict data and military data.

For example, the one or more static data types comprises at least one of: one or more satellite photos of the explosive devices field, one or more aerial photos of the explosive devices field, one or more schematic drawings of the explosive devices field and one or more maps of the explosive devices field.

For example, the one or more dynamic data types comprises at least one of: Light Detection and Ranging (LIDAR) data of the explosive devices field, hyperspectral data of the explosive devices field, electromagnetic data of the explosive devices field and three-dimensional (3-D) model of the explosive devices field.

For example, when the processing device is configured to analyses, the processing device is further configured to: collect data from the one or more global databases, one or more local databases and the AV to provide collected data, store the collected data at a storage device, fuse the collected data to provide a fused map layer, visually analysis the fused map layer to provide visual data; to provide a location of one or more suspicious areas of explosive devices at the explosive devices field; predict a level of dangerous of the one or more suspicious areas; and classify the one or more suspicious areas based on the level of dangerous, wherein the level of dangerous is selected from the CHA class, the SHA class and the NHA class.

For example, when the processing device is configured to generate the one or more datasets, the processing device is further configured to: generate at least one of: a threats dataset, classification of risk zones dataset and a polygon dataset, wherein the classification of risk zones dataset comprises a red table to predict a highest level of danger area based on the CHA class, an orange table to predict a middle level of danger area based on the SHA class and a green table to predict a low level of danger area based on the NAH class.

For example, the AV comprises a drone configured to fly over the one or more suspicious areas to provide one or more sensors read to be used by the processing device to update the one or more weights of one or more sensors and the one or more tables configured to predict a probability of existence of an explosive device in one or more suspicious area of explosive devices at the explosive device field.

For example, the AV is configured to perform a technical survey at the one or more suspicious area to reclassified the one or more suspicious with a class selected from the SHA class and the NHA class.

Another embodiment may include a method for generating a map of an explosive devices field by a processing device which operably coupled to one or more databases, the method comprising: receiving from the one or more databases one or more data types, analyzing the one or more data types, and generating one or more datasets based on the analysis, wherein the one or more dataset includes one or more tables comprises one or more weights of one or more sensors and the one or more tables configured to predict a probability of existence of an explosive device in one or more suspicious area of explosive devices at the explosive device field based on the one or more weights; generating an initial explosive devices field map including the one or more suspicious areas classified according a level of suspicious based on the one or more datasets, wherein the level of suspicious is selected from one of a classified hazardous area (CHA) class, a suspected hazardous area (SHA) class and a none hazardous area (NHA) class; receiving from an autonomous vehicle (AV) one or more actual data collected from the one or more suspicious areas of the explosive devices field classified as CHA and SHA and updating the one or more tables of the one or more datasets based on the one or more actual data and reclassifying the one or more CHA and SHA suspicious areas at the at the explosive field map based on the updated one or more tables.

For example, analyzing comprising: collecting data from the one or more global databases, one or more local databases and the AV to provide collected data, storing the collected data at a storage device, fusing the collected data to provide a fused map layer; visually analyzing the fused map layer to provide visual data; providing a location of one or more suspicious areas of explosive devices at the explosive devices field; predicting a level of dangerous of the one or more suspicious areas; and classifying the one or more suspicious areas based on the level of dangerous, wherein the level of dangerous is selected from the CHA class, the SHA class and the NHA class.

For example, generating the one or more datasets comprising: generating at least one of: a threats dataset, classification of risk zones dataset and a polygon dataset, wherein the classification of risk zones dataset comprises a red table, based on the CHA class, to predict a highest level of danger area, an orange table, based on the SHA class, to predict a middle level of danger area and a green table, based on the NHA class, to predict a low level of danger area.

One other embodiment may include a product comprising one or more tangible computer-readable non-transitory storage media comprising program instructions for generating a map of an explosive devices field, wherein execution of the program instructions by one or more processors comprising: receiving from one or more databases one or more data types; analyzing the one or more data types and generating one or more datasets based on the analysis, wherein the one or more dataset includes one or more tables comprises one or more weights of one or more sensors and the one or more tables configured to predict a probability of existence of an explosive device in one or more suspicious area of explosive devices at the explosive device field based on the one or more weights; generating an initial explosive devices field map including the one or more suspicious areas classified according a level of suspicious based on the one or more datasets, wherein the level of suspicious is selected from one of a classified hazardous area (CHA) class, a suspected hazardous area (SHA) class and a none hazardous area (NHA) class; receiving from an autonomous vehicle (AV) one or more actual data collected from the one or more suspicious areas of the explosive devices classified as CHA or SHA field and updating the one or more tables of the one or more datasets based on the one or more actual data and reclassifying the one or more suspicious areas at the explosive field map based on an updated one or more tables.

For example, the AV comprises: a first storage device to store the explosive field map, a navigation system to navigate the AV through one or more suspicious areas at the explosives devices field according to a location and a class of the one or more suspicious areas at the explosive devices field map; a location sensor to provide an instantaneous location of the AV and to provide to the local database the instantaneous location of an explosive device at the explosive devices field to update boarders of the one or more suspicious areas of the explosive devices at the explosive devices field; a visual sensor to provide an image of the explosive device; a magnetic field sensor to sense metals, a hyperspectral camera to sense explosives based on a reflected emission from a ground surface, a ground penetrating radar to provide data related to the explosive devices at the explosive devices field and a data communication device to provide discover explosive data to the processing device.

For example, the data types comprise the one or more the one or more global data types which comprise at least one of: environment data, administrative boundaries data, geopolitical data, population data, anthropology data, conflict zone data and time and date of the conflict data and military data.

For example, the one or more the one or more data types comprise the one or more static data types which comprise at least one of: one or more satellite photos of the explosive devices field, one or more aerial photos of the explosive devices field, one or more schematic drawings of the explosive devices field and one or more maps of the explosive devices field.

For example, the one or more dynamic data types comprises at least one of: Light Detection and Ranging (LIDAR) data of the explosive devices field, hyperspectral data of the explosive devices field, electromagnetic data of the explosive devices field and three-dimensional (3-D) model of the explosive devices field. For example, the program instructions, when executed the analyzing instructions comprising: collecting data from the one or more global databases, one or more local databases and the AV to provide collected data, storing the collected data at a storage device, fusing the collected data to provide a fused map layer, visually analyzing the fused map to provide visual data and providing a location of one or more suspicious areas of explosive devices at the explosive devices field; predict a level of dangerous of the one or more suspicious areas and classify the one or more suspicious areas based on the level of dangerous.

For example, the program instructions, when executed the generating the one or more datasets instructions comprising: generating at least one of: a threats dataset, classification of risk zones dataset and a polygon dataset, wherein the classification of risk zones dataset comprises a red table to predict a highest level of danger area, an orange table to predict a middle level of danger area and a green table to predict a low level of danger area.

For example, the AV comprises at least one of a bagger or a drone configured to detect and to neutralize the one or more explosive devices and a drone.

It is understood from the present disclosure described solutions for shortcomings in the field of the art. More specifically, the embodiments described herein enables generating of a map of an explosive devices field by a system that receive data from plurality of data sources which reduce the need to scan all the explosive devices field and to scan only suspicious areas designated by the map.

DETAILED DESCRIPTION

Figure 1:
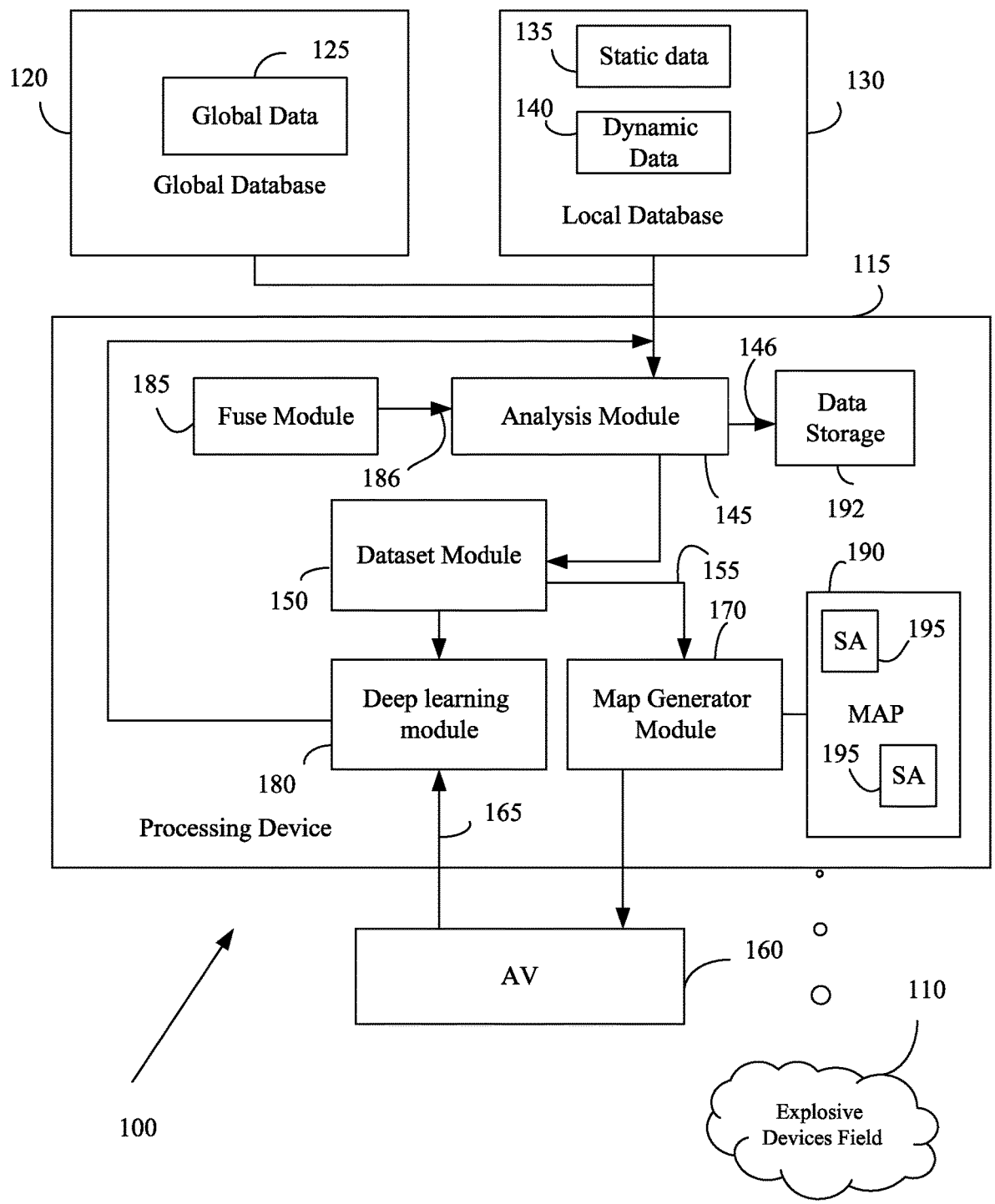
FIG. 1 illustrates a system for generating a map of an explosive devices field, according to some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The term "module" as used hereinbelow is an object file that contains code to extend the running kernel environment.

The term "explosive device(s)" us used hereinbelow is a generic term for anti-personnel mine, artillery shells, bomb, grenade, improvised explosive device, land mine, nuclear explosive device, unexploded ordnance and the like.

The term "explosive device(s) field" as used hereinbelow is a geographic field that include or is suspected to include one or more landmines, bombs, shells, explosives and the like.

The term "autonomous vehicle (AV)" as used hereinbelow is generic term for autonomous mine clearing robots, drones, autonomous explosives clearing robots, autonomous bagger and the like.

The term "an artificial neural network (ANN)" as used hereinbelow is a network of simple elements called artificial neurons, which receive input, change their internal state (activation) according to that input, and produce output depending on the input and activation. An artificial neuron mimics the working of a biophysical neuron with inputs and outputs, but is not a biological neuron model. The network forms by connecting the output of certain neurons to the input of other neurons forming a directed, weighted graph. The weights as well as the functions that compute the activation may be modified by a process called learning and/or deep learning which is governed by a learning rule.

For example, an artificial neural network's learning rule or learning process is a method, mathematical logic or algorithm which improves the network's performance and/or training time. Usually, this rule is applied repeatedly over the network. It may be done by updating the weights and bias levels of a network when a network is simulated in a specific data environment. For example, a learning rule may accept existing conditions (weights and biases) of the network and will compare the expected result and actual result of the network to give new and improved values for weights and bias. Depending on the complexity of actual model being simulated, the learning rule of the network may be, for example, an XOR gate and/or a mean squared error and/or a result of a system of differential equations and etc.

The learning rule is one of the factors which decides how fast or how accurately the artificial network can be developed. Depending upon the process to develop the network there are three main models of machine learning:

Embodiments that described hereinbelow may include an example of implementation of a system configured to map explosive devices location at an explosive devices field. This example includes a prediction software combined with autonomous vehicle (AV) e.g., autonomous mine clearing robots. The prediction software may include data collection and data fusion from various sources, static-historical and dynamic sources, anomalous technology such as, for example, electromagnet, hyper spectrally camera, thermic camera, ground penetration radar, Lidar camera ultra-sound and digital image processing for pre-processing captured images of the contaminated area and the like.

In some embodiments, after enhancement, the ANN may be used in order to identify, recognize and classify the explosive devices, e.g., landmines, by creating a model. For example, the ANN may use at least one of classification algorithms such as, for example, a random forest algorithm, a logistic regression algorithm, a decision tree algorithm, a naïve bayes classifier algorithm, a K-Nearest Neighbor (KNN) algorithm, an artificial neural networks and deep neural networks algorithm or the like to create the model. It should be understood that other algorithms not mention above including customized classification algorithms may be used to create the model.

For example, a back-propagation algorithm (known in the ANN art) may be used for training the network, in order to identify and classify different types of explosive devices e.g., landmines, under various conditions such as, for example, rotated landmine, partially covered landmine and the like.

Advantageously, the ability to fuse different types of data in a single system, give it a scalable abstract visualization, data sets and test engine contradictions, which are synchronized with autonomous robots, will enable the system to be the most efficient and provides a safe explosive devices clearance platform. Furthermore, the system will be automatically synchronized with the AV; e.g., autonomous mine clearance robots, who will follow the system recommendations in order to ensure that the system insights are correct. The system recommendation may guide a precise explosives clearance activity only on a defined hazard area, for example 20% of the area, by reducing and canceling 80% of the suspected hazard areas.

In some demonstrative embodiments, the system is configured to generate a map of explosive devises field may include, for example at least a database engine that merging static and dynamic data, a machine learning program that include an algorithm configured to recognize, define and classify a location size and type of the explosives expected in a defined area, mark and build a model of a risk area based on the algorithm. The system may further include a geographic code (Geo) system. For example, the Geo system may include, Web Geo system, desktop Geo system, and mobile Geo system with applicative interfaces for remote sensing technologies sources or the like.

In some demonstrative embodiments, the AVAV, e.g., autonomous mine clearance robots, may follow the instructions and may execute a mine clearance procedure without any physical intervention, if desired.

In some embodiments, for example, a general global worldwide database may server with approach to the latest update, data collection from a variety of sources into a Geo Database by a data collection procedure, if desired.

In some embodiments, the data may include static data which may include for example, historical conflict research, old military maps, old aerial photos, old prescriptions, text information, testimony of locals, set of multiple levels of information: geographic, geological, historical, technical, hydrological, news, and the like as well as their classification according to the level of reliability, certainty and up to date.

In some embodiments, the data may include a dynamic data which may include, for example, remote sensing sources such as, for example, a ground penetration radar, an infra-red sensor, an ultra sound sensor, a thermic camera, a hyper spectrally camera, an electromagnet sensor, point clouds and three-dimensional (3D) models, although it should be understood that the embodiments are not limited to the above mention examples.

In some embodiments, a processing unit and/or processor circuitry may use a data fusion procedure to merge a plurality, e.g., hundreds or more, layers into a similar format. For example, the data fusion procedure may provide the fused layers accreditation and credibility. For example, the data fusion procedure is configured to position layers one on each other, for example, accuracy of 500 CM. In other embodiments other and/or better accuracy can be achieved.

In some embodiments, a processing unit and/or processor circuitry may use analysis and visualization procedures for abstraction of data on geographic information system to enable to build and observe datasets, if desired.

In some embodiments, a processing unit and/or processor circuitry may use a machine learning algorithm to learn through models, examples, identifying patterns and patterns recognition and configured to provide statistical calculations of the various threat levels, comparison of cells of the area, finding of alluvial characteristics and/or areas that may be release out by technical survey, or the like.

In some embodiments, the system may identify and categorize high-risk areas that require immediate attention. For example, the system may know how to prioritize areas according to previous characteristics and events and may recommend a method of treatment from a wide range of options that provides a unique solution for each separate area on a suspected area where not all the necessary complementary actions have been carried out yet.

In some embodiments, the system may result a new polygon model, that includes the area, e.g., the exact area that needs to be cleared. The system may provide a recommendation of actions such as, for example, quality control actions on the areas that the system marked as an area without any risk of explosive devices such as, for example, mines and/or explosive remnants of war (ERW).

Turning first to FIG. 1, is an illustration of a system 100 for generating a map of an explosive devices field, according to some demonstrative embodiments.

In some embodiments, a system 100 for generating a map 190 of an explosive devices field 110 may include, for example a processing device 115.

For example, processing device 115 may include, for example, processor circuitry, logic, a server, a computer, or the like.

In some embodiments, processing unit 115 may be configured to receive from one or more global databases 120 one or more global data types 125. For example, the one or more data types 125 may include at least one of: environmental data, administrative boundaries data, geopolitical data, population data, anthropology data, conflict zone data and time and date of the conflict data and military data or the like.

In some embodiments, processing unit 115 may be configured to receive from one or more local databases 130 one or more static data types 135 and one or more dynamic data types 140.

For example, the one or more static data types 135 may include at least one of: one or more satellite photos of the explosive devices field, one or more aerial photos of the explosive devices field, one or more schematic drawings of the explosive devices field and one or more maps of the explosive devices field and the like.

For example, the one or more dynamic data types 140 may include at least one of: Light Detection and Ranging (LIDAR) data of explosives at the explosive devices field, hyperspectral data of the explosive devices field, electromagnetic data of the explosive devices field and three-dimensional (3-D) model of the explosive devices field and the like.

In some embodiments, processing unit 115 may include an analysis module 145. For example, analysis module 145 may be configured to analysis the one or more global data types 125, the one or more static data types 135 and the one or more dynamic data types 140.

In some embodiments, analysis module 145 may be configured collect data from the one or more global databases 120, one or more local databases 130 and from an AV 160 to provide collected data 146. For example, analysis module 145 may store collected data 146 at a storage device 190, if desired.

In some embodiments, processing unit 115 may include a fuse module 185. For example, fuse module 185 may be configured to fuse the collected data and to provide a fused map layer 186 to analysis module 145.

In some embodiments, analysis module 145 may visually analysis the fused map layer 186 to provide visual data and may analysis the visual data to provide predicted explosive devices location data, if desired.

In some embodiments, processing unit 115 may include a dataset module 150. For example, dataset module 150 may be configured to generate one or more datasets 155 based on the analysis. For example, a dataset may include a layer data table. The data in the table may be normalized, for example, to a scale of numbers. For example, dataset module 150 may generate at least one of: a threats dataset, classification of risk zones dataset and a polygon dataset, if desired.

In some embodiments, processing unit 115 may include map generator module 170. For example, map generator module may generate an explosive devices field map 190 based on the one or more datasets 155.

For example, explosive field map 190 may include one or more suspicious areas (SA) 195. SA 195 may include area with very high probability to include explosives devices, for example, 90%-100% probability, e.g., SA 195 may be referred as a red area.

In some embodiments, processing unit 115 may receive from an AV 160 one or more actual data collected from explosive devices field 110. For example, AV 160 may generate a criterion to locate an explosive device at the explosive devices field 110 based on the one or more actual data 165.

In some embodiments, for example, AV 160 may include an at least one of: a navigation system to navigate the AV trough the explosives field according to explosives search and discover algorithm, a magnetic sensor to sense metals, a hyperspectral camera to sense explosives based on a reflected emission from the surface, a ground penetrating radar to provide data about explosives, a location sensor to provide an instantaneous location of the AV and to provide to local database 130 the instantaneous location of an explosive device at explosive device field 110 in order to generate the second explosive devices field map, and a data communication device to provide the discover explosive data to processing device 115.

In some embodiments, AV 160 may include for example, at least one of: a drone, a bagger to detect and to neutralize the one or more explosive devices and/or autonomous mine clearance robot, if desired.

In some embodiments, processing unit 115 may include a deep learning module 180. For example, deep learning module 180 may receive actual data 165 from AV 160.

For example, AV 180 may scan the one or more SA 190, e.g., only the one or more SA 195, for explosive devices. The deep learning module 180 may process the data with a deep learning algorithm, for example ANN algorithm. Deep learning module 180 may provide his learning to analysis module 145 to update map 190 according to its learning.

In some embodiments, processing unit 115 may update, for example, by map generator module 170, the explosive field map 190 based the actual data and the criterion, although it should be understood that this embodiment is not limited to this example and other embodiments can generate second explosive device field map, if desired.

Figure 2:
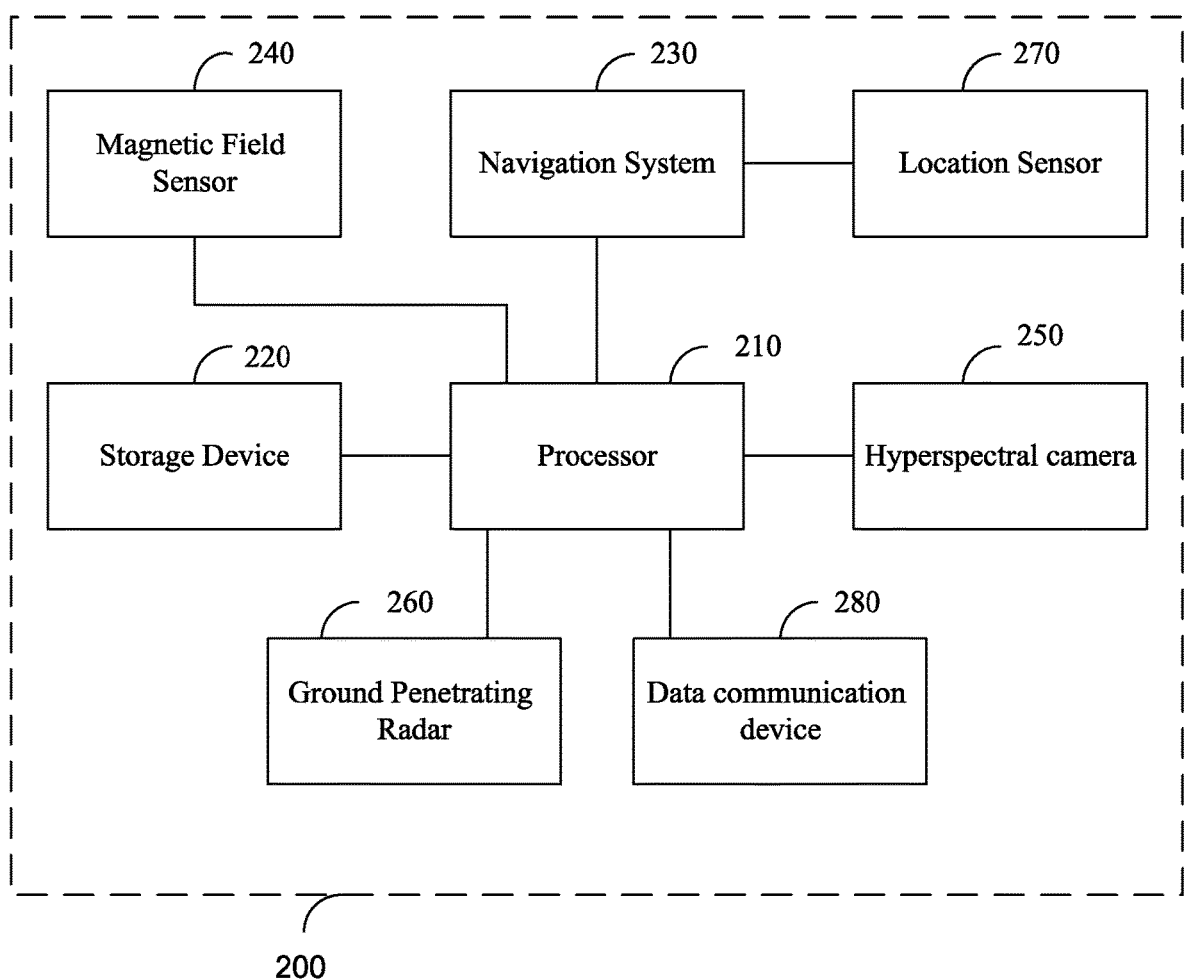
FIG. 2 illustrates a block diagram of an autonomous vehicle (AV), according to some demonstrative embodiments.

Turning to FIG. 2, which is a schematic illustration of a block diagram of AV 200, according to some demonstrative embodiments. In some demonstrative embodiments, AV 200 may include at least one of: a processor 210, a storage device 220, a navigation system 230, a magnetic field sensor 240, a hyperspectral camera 250, a ground penetrating radar 260, a location sensor 270 and a data communication device 280.

In some demonstrative embodiments, AV 200 may include a drone. For example, the drone may fly over an explosive devices field, e.g., explosive devices field 110 (FIG. 1) to collect data from a plurality of explosives at the explosive device field and to provide the collected data to a system for generating a map, e.g., map 190 (FIG. 1) of an explosive devices field 110 (FIG. 1). The system, e.g., system 100 (FIG. 1) may update its generated map according to the collected data.

In some demonstrative embodiments, AV 200 may include a bagger. For example, the bagger may be equipped with a map of explosive devices field, e.g., map 190 (FIG. 1), of the explosive devices field, e.g., explosive devices field 110 (FIG. 1), to collect data from a plurality of explosives at the explosive device field. For example, AV 200 may scan the one or more SA 195, e.g., only the one or more SAs 195, to provide the collected data to system 100 (FIG. 1) for updating the map, e.g., map 190 (FIG. 1) of an explosive devices field 110 (FIG. 1).

In one embodiment, system 100 (FIG. 1) may update its generated map according to the collected data and return the updated map, e.g., map 190 (FIG. 1), to the bagger for digging out the explosive from the ground according to the updated map, e.g., map 190. In other embodiments, system 100 may update its generated map according to the collected data by other types of AV, such as, for example drone.

In some demonstrative embodiments, AV 200 may include processor 210. For example, processor 210 may include circuitry logic and software to control the operation of AV 200 and to store collected data at storage device 220. For example, processor 210 may include single core processor, multi-core processor, a RISC processor, a controller and the like.

In some demonstrative embodiments, AV 200 may include storage device 220. For example, storage device 220 may be configured to store the explosive field map and the collected data. For example, storage device 220 may include a volatile memory and/or a non-volatile memory, including random access memory, a read only memory (RAM), a programmable memory, a magnetic memory, a Flash memory, a persistent memory, and the like In some demonstrative embodiments, AV 200 may include navigation system 230. For example, navigation system 230 may be configured to navigate AV 200 through the explosives field according to an explosives search and discover algorithm.

For example, navigation system 230 may include an inertial navigation system, a compass navigation system, a satellite navigation system, a global navigation satellite system (GNSS), Global Positioning System (GPS), GLONASS, BeiDou Navigation Satellite System (BDS), Galileo satellite navigation system and the like.

In some demonstrative embodiments, AV 200 may include a location sensor 270. Location sensor 270 may be operably coupled to navigation system 230 and may be configured to provide an instantaneous location of AV 200. Location sensor 270 may be configured to provide the location to system 100 (FIG. 1) in order to update the location of an explosive device at the explosive devices map, e.g., map 190 (FIG. 1).

For example, location sensor 270 may include a GPS receiver, a compass and the like In some demonstrative embodiments, AV 200 may include magnetic field sensor 240 to sense metals which may indicate on an explosive device. For example, magnetic field sensor 240 may include a magnetometer and the like.

In some demonstrative embodiments, AV 200 may include a hyperspectral camera 250. Hyperspectral camera 250 may be configured to sense explosives based on a reflected emission from a ground surface. For example, hyperspectral camera 250 may include hyperspectral camera imaging sensor (not shown) and/or the like.

In some demonstrative embodiments, AV 200 may include a ground penetrating radar (GPR) 260. The ground penetrating radar 260 may be configured to provide data related to the explosive devices at the explosive devices field. For example, ground penetrating radar 260 may include in pipe-penetrating radar (IPPR), Sewer ground penetrating radar (ISGPR) or the like.

In some demonstrative embodiments, AV 200 may include a data communication device 280. The data communication device 280 is configured to provide discover explosive data to the processing device 115 (FIG. 1). For example, data communication device 280 may include a wired communication device, a wireless communication device, a cellphone, a Wi-Fi device, a satellite communication device and the like.

Figure 3:
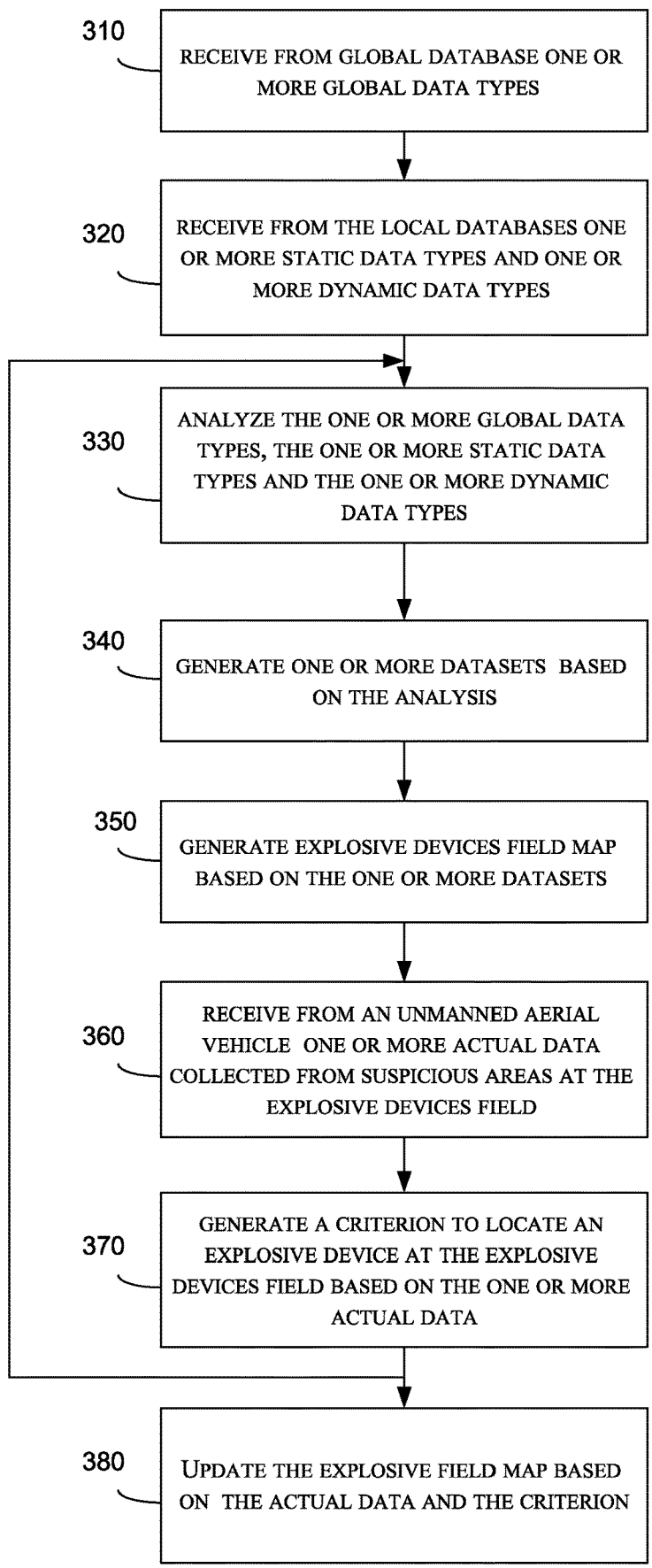
FIG. 3 illustrates a flow chart of a method to generate a map of explosive devices field, according to some demonstrative embodiments.

Turning to FIG. 3, which is a schematic illustration of a flow chart of a method 300 to generate a map of explosive devices field, according to some demonstrative embodiments. In some demonstrative embodiments, method for 300 generating a map of an explosive devices field, e.g., map 190 (FIG. 1) by a processing device, e.g., processing device 115 (FIG. 1) which operably coupled to a global database, global database 120 (FIG. 1) and a local database, local database 130 (FIG. 1). Method 300 may include receiving from the global database one or more global data types, e.g., global data types 125 (FIG. 1) (text box 310).

In some demonstrative embodiments, method 300 may receive from the local databases 120 one or more static data types 135 and one or more dynamic data types 140 (text box 320).

In some demonstrative embodiments, method 300 may analyze the one or more global data types 125, the one or more static data types 135 and the one or more dynamic data types 140 (text box 330) and may generate one or more datasets 155 based on the analysis (text box 340). For example, the generating the one or more datasets may include generating at least one of: a threats dataset, classification of risk zones dataset and a polygon dataset and the like. It should be understood that other datasets may be generated by other embodiments.

In some embodiments, the analysis may include collecting data from the one or more global databases 120, one or more local databases 130 and AV 160 in order to provide collected data 165 (FIG. 1), if desired.

Furthermore, the analysis may include storing the collected data at storage device 190 (FIG. 1), fusing the collected data 165 to provide a fused map layer 186 (FIG. 1), visually analyzing the fused map layer 186 to provide visual data and analyzing the visual data to provide predicted explosive devices location data, although the scope of the present embodiment is not limited in that respect.

In some demonstrative embodiments, one or more fusing and analyzing algorithm may be used on the collected data.

In some demonstrative embodiments, method 300 may generate an explosive devices field map, e.g., map 190 (FIG. 1) based on the one or more datasets 155 (text box 350). For example, a dataset may include a layer including one or more data tables. The data in the one or more data tables may be normalized, for example, to a scale of numbers.

In some demonstrative embodiments, the generation of the map may be done by algorithm which configured to designate one or more suspicious areas of explosive devices based on the data. For example, the map may include a surface map. The surface map may include location points of the explosive device with it risk rate. For example, the risk rate may be in a scale of 1 to 100. In other embodiments different scales may be used.

In some demonstrative embodiments, the generated map may include the one or more suspicious areas, e.g., SP 195 (FIG. 1) of explosive devices at the explosive devices field, e.g., explosive devices field 110 (FIG. 1).

In some demonstrative embodiments, method 300 may receive from AV 160 (FIG. 1) one or more actual data 160 (FIG. 1) collected from the explosive devices field 110 (FIG. 1) (text box 360) and may generate a criterion to locate an explosive device at the explosive devices field 110 based on the one or more actual data 165 (text box 370). For example, the generation of the creation may be done by a deep learning process with ANN. In other embodiments, other deep learning methods may be used.

In some demonstrative embodiments, method 300 may update boarders of the one or more suspicious areas at the at the explosive devices field map, e.g., map 190 (FIG. 1) based on the actual data 165 and the criterion (text box 380).

For example, map 190 may include an up to date location of the explosive devices at the one or more suspicious areas 195 (FIG. 1) at the explosive devices field 110 (FIG. 1).

Figure 4:
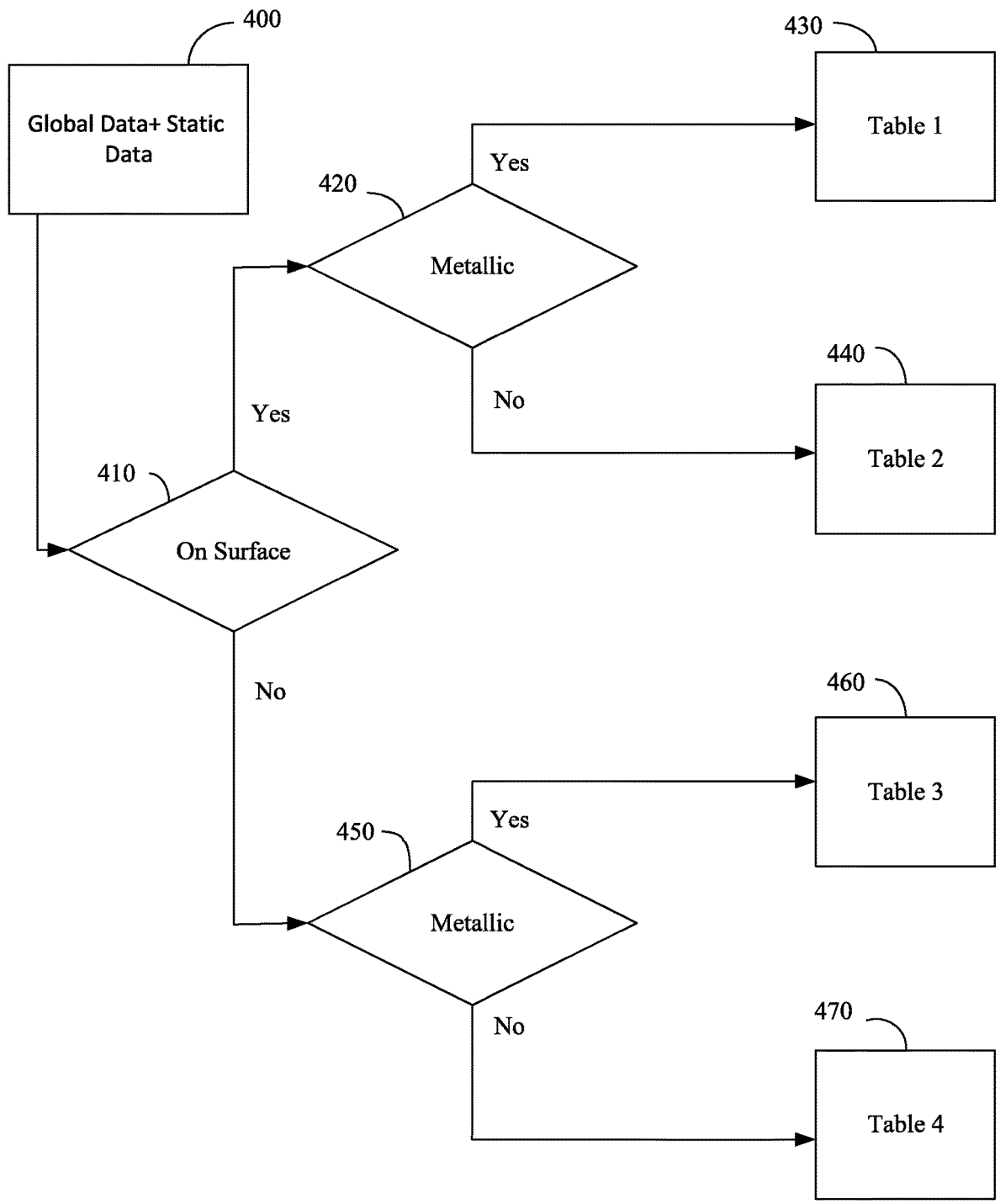
FIG. 4, illustrates a method of predicting a suspicious area on a map of explosive devices fields, according to some demonstrative embodiments.

Turning to FIG. 4, which is a schematic illustration of a method of predicting a suspicious area on a map of explosive devices fields, according to some demonstrative embodiments.

In some demonstrative embodiments, a processing device, e.g., processing device 115 (FIG. 1), may receive global data and, static data and/or dynamic data from one/or more sensors and anmay further receive an initial explosive field map with one or more suspicious areas (text box 400).

In some demonstrative embodiments, for example, the sensors may be included in an AV, e.g., a drone, a bugger and the like. For example, the sensors may include at least one of an electro optic sensor, e.g., visual (vis) sensor, a magnetic field sensor and/or a hyperspectral sensor, it should be understood that other embodiments may include more and/or other type of sensors.

In some demonstrative embodiments, the explosive field map may include one or more suspicious areas, e.g., SA 195 (FIG. 1). For example, the one or more suspicious areas may be classified by a color code, for example, Red (R) and/or classified hazardous area (CHA), Orange (O) and/or suspected hazardous area (SHA) and Green (G) and/or None hazardous area (NHA).

In this example, the Red may be used with indicate a suspicious area with a very high probability to include explosives, e.g., mines. The Orange may be used with indicate a suspicious area with a medium probability to include explosives, e.g., mines, and the Green may be used with indicate a suspicious area with a low probability to include explosives, e.g., mines, and/or without explosives, e.g., mines.

In some demonstrative embodiments, the processing device may use, for example, one or more machine learning methods to generate the explosive field map.

In some demonstrative embodiments, a machine learning method may include at least two process in which a result, e.g., an output, of the first process may be used as an input of the second process and vis versa. For example, the machine learning method may set to each sensor, e.g., a sensor, a weigh based on the location of the explosive device, e.g., on surface and/or under surface. and if the explosive device includes a metal or plastic part. The process may update the weighs, for example, according to the percentage of success in predicting the location of the explosive device in the subspecies area.

Advantageously, by using the above described two steps machine learning process, only the orange and the green surprises area may be inspected by a technical survey (TS). For example, the TS my be done by AV, e.g., bugger and/or any other ground AV. This may decrease the size of the inspected area.

In some of demonstrative embodiments, by using the above machine learning process, the processing may generate an explosive device map which may include two classes of suspicious areas, e.g., a red classified suspicious area and a green classified suspicious area, if desired.

In some demonstrative embodiments, the processing device may process the data and may determent if an explosive device is on a surface, e.g., "Yes" (diamond 410). If the explosive is on the surface then the processing device may determent if the explosive device includes metal (text box 420). If the explosive includes metal, the processing device may set weights, e.g., weights of evidence of finding probability, according to a table 1 which related to the color of the suspicious area (text box 430). If the explosive does not include metal, the processing device may set weights, e.g., weights of evidence of finding probability, according to table 2 which related to the color of the suspicious area (text box 440).

In some demonstrative embodiments, the processing device may process the data and may determent that the explosive device is under the surface, e.g., "No", (diamond 410). If the explosive is on the surface then the processing device may determent if the explosive device includes metal (text box 450). If the explosive includes metal, the processing device may set weights, e.g., weights of evidence of finding probability, according to a table 3 based on the color of the suspicious area (text box 460). If the explosive does not include metal, the processing device may set weights, e.g., weights of evidence of finding probability, according to table 4 based on the color of the suspicious area (text box 470).

In some demonstrative embodiments, for example, table 1 (430) may include Table R1, Table O1 and Table G1, as is shown below:

TABLE 1-TABLE R1

| Sensor type | Evidence of Finding Probability | | |
| --- | --- | --- | --- |
| | $1^{st}$ Input | $2^{nd}$ Input | $3^{rd}$ Input |
| Vis | >0.8 | .>=0 | >0.5 |
| Magnetic | .>=0 | >0.6 | <0.5 |
| Hyperspectral | .>=0 | .>=0 | >0.5 |
| Result | Red | Red | Red |

Rest—Technical Survey (TS)

TABLE O1

| Sensor type | Evidence of Finding Probability | | | |
| --- | --- | --- | --- | --- |
| | $1^{st}$ Input | $2^{nd}$ Input | $3^{rd}$ Input | $4^{th}$ Input |
| Vis | >0.8 | .>=0 | .>=0 | >0.5 |
| Magnetic | .>=0 | >0.8 | 0.5< x <0.8 | 0.5< x <0.8 |
| Hyperspectral | .>=0 | .>=0 | >0.5 | .>=0 |
| Result | Red | Red | Red | Red |

Rest—Green

TABLE G1

| Sensor type | Evidence of Finding Probability | | | |
| --- | --- | --- | --- | --- |
| | $1^{st}$ Input | $2^{nd}$ Input | $3^{rd}$ Input | $4^{th}$ Input |
| Vis | >0.8 | .>=0 | .>=0 | >0.5 |
| Magnetic | .>=0 | >0.8 | 0.5< x <0.8 | 0.5< x <0.8 |
| Hyperspectral | .>=0 | .>=0 | >0.5 | .>=0 |
| Result | Red | TS | TS | TS |

Rest—Green

In some demonstrative embodiments, table R1 may be used when the suspicious area in the initial explosive field is classified as red and the explosive devices are on surface and may have metallic parts. For example, a drone may fly over an initially red classified suspicious area in order to find one or more explosive devices based on its sensors reading. The processing device may update the weights of table R1 based on the sensors reading and the probability of finding an explosive device at the initially red classified suspicious area. Furthermore, the processing device may decide if the suspicious area is red and/or need a ground technical survey (TS) based on the weights at the input columns, e.g., $1^{st}$ input, $2^{nd}$ input and $3^{rd}$ input of table R1.

For example, according to 1$^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to 2$^{nd}$ input, the processing device may classify the as suspicious area red if the magnetic sensor detects a metallic object on the surface.

Yet, in another example, according to 3$^{nd}$ input, the processing device may classify the suspicious area as red if there is a read from, the visual sensor, the magnetic sensor and the hyperspectral sensor.

In some other demonstrative embodiments, there may be more inputs to table R1 with other combinations of weights. At least according to some other inputs, the processing device may use inputs from a ground technical survey to classify the suspicious area, for example, as red or green.

In some demonstrative embodiments, table O1 may be used when the suspicious area in the initial explosive field is classified as orange and the explosive devices are on surface and may have metallic parts. For example, a drone may fly over an initially orange classified suspicious area in order to find one or more explosive devices based on its sensors reading. The processing device may update the weights of table O1 based on the sensors reading and the probability of finding an explosive device at the initially orange classified suspicious area. Furthermore, the processing device may decide if the suspicious area is red or green and/or need a ground technical survey (TS) based on the weights at the input columns, e.g., 1$^{st}$ input, 2$^{nd}$ input, 3$^{rd}$ input and 4$^{th}$ input of table O1.

For example, according to 1$^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to 2$^{nd}$ input, the processing device may classify the as suspicious area red if the magnetic sensor detects a metallic object on the surface.

Yet, in another example, according to 3$^{nd}$ input, the processing device may classify the suspicious area as red if there is a read from the magnetic sensor weighted with a weight range, for example, between 0.5 to 0.8 and the hyperspectral sensor weighted with a weight of, for example, greater than 0.5.

Yet, in another example, according to 4$^{th}$ input, the processing device may classify the suspicious area as red if there is a read from the visual sensor weighted with a weight, for example, greater than 0.5 and the magnetic sensor with weight range, for example, between 0.5 to 0.8.

In some other demonstrative embodiments, there may be more inputs to table O1 with other combinations of weights. At least according to some of the other inputs, the processing device may classify the suspicious area, for example, as green.

In some demonstrative embodiments, table G1 may be used when the suspicious area in the initial explosive field is classified as green and the explosive devices are on surface and may have metallic parts. For example, a drone may fly over an initially green classified suspicious area in order to find one or more explosive devices based on its sensors reading. The processing device may update the weights of table G1 based on the sensors reading and the probability of finding an explosive device at the initially green classified suspicious area. Furthermore, the processing device may decide if the suspicious area is red or green and/or need a ground technical survey (TS) based on the weights at the input columns, e.g., 1$^{st}$ input, 2$^{nd}$ input, 3$^{rd}$ input and 4$^{th}$ input of table G1.

For example, according to 1$^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to 2$^{nd}$ input, the processing device may not classify if the magnetic sensor detects a metallic object on the surface. In this scenario, the processing device may need sensor reading from the sensors of AV which performs a TS on the initially classified green area.

Yet, in another example, according to 3$^{nd}$ input, the processing device may not classify the suspicious area if there is a read from the magnetic sensor weighted with a weight range, for example, between 0.5 to 0.8 and the hyperspectral sensor weighted with a weight of, for example, greater than 0.5. In this scenario, the processing device may need sensor reading from the one or more sensors of AV which performs a TS on the initially classified green area.

Yet, in another example, according to 4$^{th}$ input, the processing device may not classify the suspicious area as red if there is a read from the visual sensor weighted with a weight, for example, greater than 0.5 and the magnetic sensor weighted with a weight range, for example, between 0.5 to 0.8. In this scenario, the processing device may need sensor reading from the one or more sensors of AV, which performs a TS on the initially classified green area.

In some other demonstrative embodiments, there may be more inputs to table G1 with other combinations of weights. At least according to some of the other inputs, the processing device may classify the suspicious area, for example, as green.

In some demonstrative embodiments, for example, table 2 (440) may include Table R2, Table O2 and Table G2, as is shown below:

TABLE R2

| Sensor type | Evidence of Finding Probability | | |
| --- | --- | --- | --- |
| | 1$^{st}$ Input | 2$^{nd}$ Input | 3$^{rd}$ Input |
| Vis | >0.8 | >0.5 | .>=0 |
| Magnetic | .>=0 | .>=0 | .>=0 |
| Hyperspectral | .>=0 | >0/.5 | .>=0 |
| Result | Red | Red | TS |
| Rest—TS | | | |

TABLE O2

| Sensor type | Evidence of Finding Probability | | |
| --- | --- | --- | --- |
| | 1$^{st}$ Input | 2$^{nd}$ Input | 3$^{rd}$ Input |
| Vis | >0.8 | .>=0 | >0.5 |
| Magnetic | .>=0 | 0.4< x <0.6 | <0.6 |
| Hyperspectral | .>=0 | >0.5 | .>=0 |
| Result | Red | Red | Red |
| Rest—Green | | | |

TABLE G2

| Sensor type | Evidence of Finding Probability | | | |
|---|---|---|---|---|
| | 1$^{st}$ Input | 2$^{nd}$ Input | 3$^{rd}$ Input | 4$^{th}$ Input |
| Vis | >0.8 | .>=0 | >0.5 | .>0.5 |
| Magnetic | .>=0 | >0.8 | <0.5 | 0.5< x <0.8 |
| Hyperspectral | .>=0 | .>=0 | >0.5 | >0.5 |
| Result | Red | TS | TS | Red |

Rest—Green

In some demonstrative embodiments, table R2 may be used when the suspicious area in the initial explosive field is classified as red and the explosive devices are on surface and may have no metallic parts. For example, a drone may fly over an initially red classified suspicious area in order to find one or more explosive devices based on its sensors reading. The processing device may update the weights of table R2 based on the sensors reading and the probability of finding an explosive device at the initially red classified suspicious area. Furthermore, the processing device may decide if the suspicious area is red and/or need a ground technical survey (TS) based on the weights at the input columns, e.g., 1$^{st}$ input, 2$^{nd}$ input and 3$^{rd}$ input of table R2.

For example, according to 1$^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to 2$^{nd}$ input, the processing device may classify the suspicious area as red if the visual sensor and the hyperspectral sensor detect a non-metallic object on the surface.

Yet, in another example, according to 3$^{rd}$ input, the processing device may classify the suspicious area as TS if there is no read from, the visual sensor, the magnetic sensor and the hyperspectral sensor.

In some other demonstrative embodiments, there may be more inputs to table R2 with other combinations of weights. At least according to some other inputs, the processing device may use inputs from a ground technical survey to classify the suspicious area, for example, as red or green.

In some demonstrative embodiments, table O2 may be used when the suspicious area in the initial explosive field is orange. For example, a drone may fly over an initially orange classified suspicious area in order to find one or more explosive devices based on its sensors reading. The processing device may update the weights of table O2 based on the sensors reading and the probability of finding an explosive device at the initially orange classified suspicious area. Furthermore, the processing device may decide if the suspicious area is red or green and/or need a ground technical survey (TS) based on the weights at the input columns, e.g., 1$^{st}$ input, 2$^{nd}$ input and 3$^{rd}$ input of table O2.

For example, according to 1$^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to 2$^{nd}$ input, the processing device may classify the suspicious area as red if there is a read from a magnetic sensor weighted, for example, with a weight range between 0.4 to 0.6 and a hyperspectral sensor weighted, for example, with a weight greater than 0.5.

Yet, in another example, according to 3$^{rd}$ input, the processing device may classify the suspicious area as red if there is a read from the visual sensor weighted with a weight, for example, greater than 0.5 and the magnetic sensor weighted with a weight less than 0.6.

In some other demonstrative embodiments, there may be more inputs to table O2 with other combinations of weights. At least according to some of the other inputs, the processing device may classify the suspicious area, for example, as green.

In some demonstrative embodiments, table G2 may be used when the suspicious area in the initial explosive field is green. For example, a drone may fly over an initially green classified suspicious area in order to find one or more explosive devices based on its sensors reading. The processing device may update the weights of table G2 based on the sensors reading and the probability of finding an explosive device at the initially green classified suspicious area. Furthermore, the processing device may decide if the suspicious area is red or green and/or need a ground technical survey (TS) based on the weights at the input columns, e.g., 1$^{st}$ input, 2$^{nd}$ input, 3$^{rd}$ input and 4$^{th}$ input of table G2.

For example, according to 1$^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to 2$^{nd}$ input, the processing device may not classify if the magnetic sensor detects a metallic object on the surface. In this scenario, the processing device may need sensor reading from the sensors of AV which performs a TS on the initially classified green area.

Yet, in another example, according to 3$^{rd}$ input, the processing device may not classify the suspicious area if there is a read from the magnetic sensor weighted with a weight, for example, greater than 0.8. In this scenario, the processing device may need sensor reading from the one or more sensors of AV which performs a TS on the initially classified green area.

Yet, in another example, according to 4$^{th}$ input, the processing device may classify the suspicious area as red if there is a read from the visual sensor weighted with a weight, for example, greater than 0.5, the magnetic sensor weighted with a weight range, for example, between 0.5 to 0.8 and hyperspectral sensor weighted in a weight range, for example, greater than 0.5.

In some other demonstrative embodiments, there may be more inputs to table G2 with other combinations of weights. At least according to some of the other inputs, the processing device may classify the suspicious area, for example, as green.

In some demonstrative embodiments, for example, table 3 (460) may include Table R3, Table O3 and Table G3, as is shown below:

TABLE R3

| Sensor type | Evidence of Finding Probability | | |
|---|---|---|---|
| | 1$^{st}$ Input | 2$^{nd}$ Input | 3$^{rd}$ Input |
| Vis | >0.8 | .>=0 | >0.5 |
| Magnetic | .>=0 | >0.6 | <0.5 |
| Hyperspectral | .>=0 | .>=0 | >0.5 |
| Result | Red | Red | Red |

Rest—TS

TABLE O3

| Sensor type | Evidence of Finding Probability | | | |
|---|---|---|---|---|
| | 1st Input | 2nd Input | 3rd Input | 4th Input |
| Vis | >0.8 | .>=0 | .>=0 | >0.5 |
| Magnetic | .>=0 | >0.6 | 0.4< x <0.6 | <0.6 |
| Hyperspectral | .>=0 | .>=0 | >0.5 | .>=0 |
| Result | Red | Red | Red | Red |

Rest—Green/TS

TABLE G3

| Sensor type | Evidence Finding Probability | | | |
|---|---|---|---|---|
| | 1st Input | 2nd Input | 3rd Input | 4th Input |
| Vis | >0.8 | .>=0 | .>=0 | >0.5 |
| Magnetic | .>=0 | >0.6 | 0.4< x <0.6 | <0.6 |
| Hyperspectral | .>=0 | .>=0 | >0.5 | .>=0 |
| Result | Red | TS | TS | TS |

Rest—Green

In some demonstrative embodiments, table R3 may be used when the suspicious area in the initial explosive field is classified as red and the explosive devices are not on the surface and may have metallic parts. For example, a drone may fly over an initially red classified suspicious area in order to find one or more explosive devices based on its sensors reading. The processing device may update the weights of table R3 based on the sensors reading and the probability of finding an explosive device at the initially red classified suspicious area. Furthermore, the processing device may decide if the suspicious area is red and/or need a ground technical survey (TS) based on the weights at the input columns, e.g., $1^{st}$ input, $2^{nd}$ input and $3^{rd}$ input of table R3.

For example, according to $1^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to $2^{nd}$ input, the processing device may classify the suspicious area as red if the magnetic sensor detects a metallic object on the surface.

Yet, in another example, according to $3^{rd}$ input, the processing device may classify the suspicious area as red if there is a read from the visual sensor weighted in a weight, for example, greater than 0.5, the magnetic sensor weighted in a weight, for example, smaller than 0.5 and the hyperspectral sensor is weighted in a weight, for example, greater than 0.5.

In some other demonstrative embodiments, there may be more inputs to table R2 with other combinations of weights. At least according to some other inputs, the processing device may use inputs from a ground technical survey to classify the suspicious area, for example, as red or green.

In some demonstrative embodiments, table O3 may be used when the suspicious area in the initial explosive field is orange. For example, a drone may fly over an initially orange classified suspicious area in order to find one or more explosive devices based on its sensors reading. The processing device may update the weights of table O3 based on the sensors reading and the probability of finding an explosive device at the initially orange classified suspicious area. Furthermore, the processing device may decide if the suspicious area is red or green and/or need a ground technical survey (TS) based on the weights at the input columns, e.g., $1^{st}$ input, $2^{nd}$ input, $3^{rd}$ input and $4^{th}$ input of table O3.

For example, according to $1^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to $2^{nd}$ input, the processing device may classify the suspicious area as red if there is a read from a magnetic sensor weighted, for example, with a weight range greater than 0.6.

Yet, in another example, according to $3^{rd}$ input, the processing device may classify the suspicious area as red if there is a read from the magnetic sensor weighted with a weight range, for example, between 0.4 to 0.6 and hyperspectral sensor weighted in a weight, for example, greater than 0.5.

Yet, in another example, according to $4^{th}$ input, the processing device may classify the suspicious area as red if there is a read from the visual sensor weighted with a weight, for example, greater than 0.5 and the magnetic sensor weighted with a weight, for example, smaller than 0.6.

In some other demonstrative embodiments, there may be more inputs to table O3 with other combinations of weights. At least according to some of the other inputs, the processing device may classify the suspicious area, for example, as green and/or may need inputs from TS to classify the suspicious area as green or red.

In some demonstrative embodiments, table G3 may be used when the suspicious area in the initial explosive field is green. For example, a drone may fly over an initially green classified suspicious area in order to find one or more explosive devices based on its sensors reading. The processing device may update the weights of table G3 based on the sensors reading and the probability of finding an explosive device at the initially green classified suspicious area. Furthermore, the processing device may decide if the suspicious area is red or green and/or need a ground technical survey (TS) based on the weights at the input columns, e.g., $1^{st}$ input, $2^{nd}$ input, $3^{rd}$ input and $4^{th}$ input of table G3.

For example, according to $1^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to $2^{nd}$ input, the processing device may not classify if the magnetic sensor detects a metallic object under the surface. In this scenario, the processing device may need sensor reading from the sensors of AV which performs a TS on the initially classified green area.

Yet, in another example, according to $3^{nd}$ input, the processing device may not classify the suspicious area if there is a read from the magnetic sensor weighted with a weights range, for example, between 0.4 to 0.6 and from hyperspectral sensor weighted in a weight range, for example, smaller than 0.6. In this scenario, the processing device may need sensor reading from the one or more sensors of AV which performs a TS on the initially classified green area.

Yet, in another example, according to $4^{th}$ input, the processing device may not classify the suspicious area if there is a read from the visual sensor weighted in a weight, for example, greater than 0.5 and from the magnetic sensor weighted with a weights, for example, smaller than 0.6 and from hyperspectral sensor weighted in a weight range, for example, smaller than 0.6. In this scenario, the processing device may need sensor reading from the one or more sensors of AV which performs a TS on the initially classified green area.

In some other demonstrative embodiments, there may be more inputs to table G3 with other combinations of weights. At least according to some of the other inputs, the processing device may classify the suspicious area, for example, as green.

In some demonstrative embodiments, for example, table 4 (470) may include Table R4, Table O4 and Table G4, as is shown below:

TABLE R4

| Sensor type | Evidence of Finding Probability | | |
|---|---|---|---|
| | $1^{st}$ Input | $2^{nd}$ Input | $3^{rd}$ Input |
| Vis | >0.8 | .>=0 | .>=0 |
| Magnetic | .>=0 | .>=0 | .>=0 |
| Hyperspectral | .>=0 | .>=0 | .>=0 |
| Result | Red | TS | TS |

Rest—TS

TABLE O4

| Sensor type | Evidence Finding Probability | | |
|---|---|---|---|
| | $1^{st}$ Input | $2^{nd}$ Input | $3^{rd}$ Input |
| Vis | >0.8 | >0.4 | TBD |
| Magnetic | .>=0 | .>=0 | TBD |
| Hyperspectral | .>=0 | >0.6 | TBD |
| Result | Red | Red | TBD |

Rest—TS

TABLE G4

| Sensor type | Evidence of Finding Probability | | |
|---|---|---|---|
| | $1^{st}$ Input | $2^{nd}$ Input | $3^{rd}$ Input |
| Vis | >0.8 | >0.4 | TBD |
| Magnetic | .>=0 | .>=0 | TBD |
| Hyperspectral | .>=0 | >0.6 | TBD |
| Result | Red | Red | TBD |

Rest—Green

In some demonstrative embodiments, table R4 may be used when the suspicious area in the initial explosive field is classified as red and the explosive devices are not on the surface and may have no metallic parts. For example, a drone may fly over an initially red classified suspicious area in order to find one or more explosive devices based on its sensors reading. The processing device may update the weights of table R4 based on the sensors reading and the probability of finding an explosive device at the initially red classified suspicious area. Furthermore, the processing device may decide if the suspicious area is red and/or need a ground technical survey (TS) based on the weights at the input columns, e.g., $1^{st}$ input, $2^{nd}$ input and $3^{rd}$ input of table R4.

For example, according to $1^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, the weights the $2^{nd}$ input, the $3^{rd}$ input may be updated by the machine learning process. However, for weights value >=0 the result may be TS, if desired In some other demonstrative embodiments, there may be more inputs to table R4 with other combinations of weights. At least according to some other inputs, the processing device may use inputs from a ground technical survey to classify the suspicious area, for example, as red or green.

In some demonstrative embodiments, table O4 may be used when the suspicious area in the initial explosive field is orange. For example, a drone may fly over an initially orange classified suspicious area in order to find one or more explosive devices based on its sensors reading. The processing device may update the weights of table O4 based on the sensors reading and the probability of finding an explosive device at the initially orange classified suspicious area. Furthermore, the processing device may decide if the suspicious area is red or green and/or need a ground technical survey (TS) based on the weights at the input columns, e.g., $1^{st}$ input, $2^{nd}$ input and $3^{rd}$ input of table O4.

For example, according to $1^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to $2^{nd}$ input, the processing device may classify the suspicious area as red if there is a read from a magnetic sensor weighted, for example, with a weight greater than 0.4.

Yet, in another example, the weights of the $3^{rd}$ input may be defined and/or set by a machine learning process, however in another embodiment, initial weights may be manually set. Those initial values may be updated by the machine learning process, if desired.

In some other demonstrative embodiments, there may be more inputs to table O4 with other combinations of weights. At least according to some of the other inputs, the processing device may classify the suspicious area, for example, as green and/or based on sensor reading inputs from a TS.

In some demonstrative embodiments, table G4 may be used when the suspicious area in the initial explosive field is green. For example, a drone may fly over an initially green classified suspicious area in order to find one or more explosive devices based on its sensors reading. The processing device may update the weights of table G4 based on the sensors reading and the probability of finding an explosive device at the initially green classified suspicious area. Furthermore, the processing device may decide if the suspicious area is red or green and/or need a ground technical survey (TS) based on the weights at the input columns, e.g., $1^{st}$ input, $2^{nd}$ input, and $3^{rd}$ input of table G4.

For example, according to $1^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to $2^{nd}$ input, the processing device may classify the suspicious area as red if there are reads from the visual sensor weight with a weight, for example, greater than 0.4 and from the hyperspectral sensor weighted with a weight, for example, greater than 0.6.

Yet, in another example, for example, according to $1^{st}$ Input, the weight of the visual sensor is >=0.8 and the weights of the magnetic sensor and the hyperspectral sensor are >=0. If the visual sensor detects an explosive device on the surface, the processing device may classify the suspicious area as red.

In another example, according to $2^{nd}$ input, the processing device may classify the suspicious area as red if there is a read from a magnetic sensor weighted, for example, with a weight greater than 0.4.

In some demonstrative embodiments, the weights of the $3^{rd}$ input may be defined and/or set by a machine learning process, however in another embodiment, initial weights may be manually set. Those initial values may be updated by the machine learning process, if desired. In some other demonstrative embodiments, there may be more inputs to table G4 with other combinations of weights. At least according to some of the other inputs, the processing device may classify the suspicious area, for example, as green.

Figure 5:
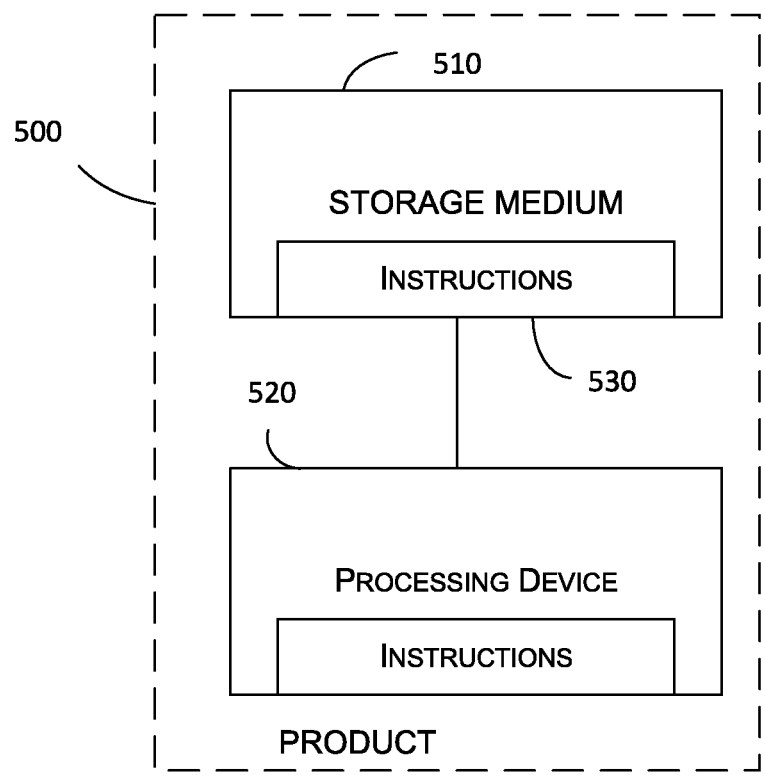
FIG. 5, illustrates a product of manufacture, according to some demonstrative embodiments.

Turning to FIG. 5, which is a schematic illustration of a product of manufacture 500, according to some demonstrative embodiments. Product 500 may include one or more tangible computer-readable non-transitory storage media 510, which may include computer-executable instructions 530, e.g., implemented by processing device 520, operable to, when executed by at least one computer processor, enable the at least one processing device 115 (FIG. 1) to implement one or more program instructions for generating a map of an explosive devices field, and/or to perform, trigger and/or implement one or more operations, communications and/or functionalities as described above with reference to FIGS. 1, 2, 3 and/or 4. The phrase "non-transitory machine-readable medium" is directed to include all computer-readable media, with the sole exception being a transitory propagating signal.

In some demonstrative embodiments, product 500 and/or machine-readable storage medium 510 may include one or more types of computer-readable storage media capable of storing data, including volatile memory, non-volatile memory, removable or non-removable memory, erasable or non-erasable memory, writeable or re-writeable memory, and the like. For example, machine-readable storage medium 410 may include any type of memory, such as, for example RAM, DRAM, ROM, programmable ROM (PROM), erasable programmable ROM (EPROM), electrically erasable programmable ROM (EEPROM), Flash memory, a hard disk drive (HDD), a solid state disk drive (SDD), and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, processing device 520 may include logic. The logic may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, processing device 520 may include, or may be implemented as, software, firmware, a software module, an application, a program, a subroutine, instructions, an instruction set, computing code, words, values, symbols, and the like. Instructions 530 may include any suitable type of code, such as source code, compiled code, interpreted code, executable code, static code, dynamic code, and the like. Instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, C#, Java, Python, BASIC, Mat lab, assembly language, machine code, and the like.

It is to be understood that the system and/or AV and/or the method for generating a map of an explosive devices field is described hereinabove by a way of example only. Other embodiments may be implemented base on the detailed description and the claims that followed.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein.

It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for processing code(s). The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s).

It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A system for generating a map of an explosive devices field comprising:
   a processing device configured to:
      receive from one or more databases one or more data types;
      analyze the one or more data types to generate one or more datasets based on the analysis, wherein the one or more datasets includes one or more tables comprising one or more weights of one or more sensors and the one or more tables configured to predict a probability of existence of an explosive device in one or more suspicious areas at the explosive device field based on the one or more weights;
      generate an initial explosive devices field map including the one or more suspicious areas classified according a level of suspicion based on the one or more datasets, wherein the level of suspicion is selected from one of a classified hazardous area (CHA) class, a suspected hazardous area (SHA) class and a non hazardous area (NHA) class;
      receive from an autonomous vehicle (AV) actual data collected from the one or more suspicious areas of the explosive devices field classified as CHA and SHA and update the one or more tables of the one or more datasets based on the actual data; and
      reclassify the one or more CHA and SHA suspicious areas at the explosive field map based on the updated one or more tables.

2. The system of claim 1, wherein the AV comprises:
   a storage device to store the explosive devices field map;
   a navigation system to navigate the AV through the one or more suspicious areas at the explosives devices field according to a location and a class of the one or more suspicious areas at the explosive devices field map;
   a location sensor to provide an instantaneous location of the AV and to provide to the local database the instantaneous location of an explosive device at the explosive devices field to update borders of the one or more suspicious areas of the explosive devices at the explosive devices field;
   a visual sensor to provide an image of the explosive device;
   a magnetic field sensor to sense metals;
   a hyperspectral camera to sense explosives based on a reflected emission from a ground surface;
   a ground penetrating radar to provide data related to the explosive devices at the one or more suspicious areas of explosive devices at the explosive devices field; and
   a data communication device to provide discovered explosive data to the processing device.

3. The system of claim 1, wherein the one or more data types comprises one or more global data types which comprises at least one of:
   environment data, administrative boundaries data, geopolitical data, population data, anthropology data, conflict zone data including time and date of the conflict data and military data.

4. The system of claim 1, wherein the one or more data types comprises one or more static data types which comprises at least one of:
   one or more satellite photos of the explosive devices field, one or more aerial photos of the explosive devices field, one or more schematic drawings of the explosive devices field and one or more maps of the explosive devices field.

5. The system of claim 1, wherein the one or more data types comprises one or more dynamic data types which comprises at least one of:
   Light Detection and Ranging (LIDAR) data of the explosive devices field, hyperspectral data of the explosive devices field, electromagnetic data of the explosive devices field and three-dimensional (3-D) model of the explosive devices field.

6. The system of claim 1, wherein when the processing device is configured to analyze, the processing device is configured to:
   collect data from the one or more global databases, one or more local databases and the AV to provide collected data;
   store the collected data at a storage device;
   fuse the collected data to provide a fused map layer;
   visually analyze the fused map layer to provide visual data;
   provide a location of one or more suspicious areas of explosive devices at the explosive devices field;
   predict a level of danger of the one or more suspicious areas; and
   classify the one or more suspicious areas based on the level of danger, wherein the level of danger is selected from the CHA class, the SHA class and the NHA class.

7. The system of claim 1, wherein when the processing device is configured to generates the one or more datasets, the processing device is further configured to:
   generate at least one of: a threats dataset, classification of risk zones dataset and a polygon dataset, wherein the classification of risk zones dataset comprises a red table to predict a highest level of danger area based on the CHA class, an orange table to predict a middle level of danger area based on the SHA class and a green table to predict a low level of danger area based on the NHS class.

8. The system of claim 1, wherein the AV is a drone configured to fly over the one or more suspicious areas to provide one or more sensors readings to be used by the processing device to update the one or more weights of one or more sensors and the one or more tables configured to predict a probability of existence of an explosive device in one or more suspicious area of explosive devices at the explosive device field.

9. The system of claim 1, wherein the AV is configured to perform a technical survey at the one or more suspicious area to reclassify the one or more suspicious areas with a class selected from the SHA class and the NHA class.

10. A method for generating a map of an explosive devices field by a processing device which is operable coupled to one or more databases, the method comprising:

receiving from the one or more databases one or more data types;

analyzing the one or more data types and generating one or more datasets based on the analysis, wherein the one or more dataset includes one or more tables comprising one or more weights of one or more sensors and the one or more tables configured to predict a probability of existence of an explosive device in one or more suspicious area of explosive devices at the explosive device field based on the one or more weights;

generating an initial explosive devices field map including the one or more suspicious areas classified according a level of suspicion based on the one or more datasets, wherein the level of suspicion is selected from one of a classified hazardous area (CHA) class, a suspected hazardous area (SHA) class and a non hazardous area (NHA) class;

receiving from an autonomous vehicle (AV) actual data collected from the one or more suspicious areas of the explosive devices field classified as CHA and SHA and updating the one or more tables of the one or more datasets based on the actual data; and reclassifying the one or more CHA and SHA suspicious areas at the explosive devices field map based on the updated one or more tables.

11. The method of claim 10, wherein analyzing comprises:
collecting data from the one or more global databases, one or more local databases and the AV to provide collected data;
storing the collected data at a storage device;
fusing the collected data to provide a fused map layer;
visually analyzing the fused map layer to provide visual data;
providing a location of one or more suspicious areas of explosive devices at the explosive devices field;
predicting a level of danger of the one or more suspicious areas; and
classifying the one or more suspicious areas based on the level of danger, wherein the level of danger is selected from the CHA class, the SHA class and the NHA class.

12. The method of claim 10, wherein generating the one or more datasets comprises:
generating at least one of: a threats dataset, classification of risk zones dataset and a polygon dataset, wherein the classification of risk zones dataset comprises a red table based on the CHA class to predict a highest level of danger area, an orange table based on the SHA to predict a middle level of danger area and a green table bases on the NHA class to predict a low level of danger area.

13. A product comprising one or more tangible computer-readable non-transitory storage media comprising program instructions for generating a map of an explosive devices field, wherein execution of the program instructions by one or more processors comprising:
receiving from one or more databases one or more data types;
analyzing the one or more data types and generating one or more datasets based on the analysis, wherein the one or more dataset includes one or more tables comprising one or more weights of one or more sensors and the one or more tables configured to predict a probability of existence of an explosive device in one or more suspicious area of explosive devices at the explosive device field based on the one or more weights;

generating an initial explosive devices field map including the one or more suspicious areas classified according a level of suspicion classified according a level of suspicion based on the one or more datasets, wherein the level of suspicion is selected from one of a classified hazardous area (CHA) class, a suspected hazardous area (SHA) class and a non hazardous area (NHA) class;

receiving from an autonomous vehicle (AV) actual data collected from the one or more suspicious areas of the explosive devices field classified as CHA or SHA and updating the one or more tables of the one or more datasets based on the actual data; and reclassifying the one or more suspicious areas at the explosive devices field map based on an updated one or more tables.

14. The product of claim 13, wherein the AV comprises:
a first storage device to store the explosive field map;
a navigation system to navigate the AV through one or more suspicious areas at the explosives devices field according to a location and a class of the one or more suspicious areas at the explosive devices field map;
a location sensor to provide an instantaneous location of the AV and to provide to the local database the instantaneous location of an explosive device at the explosive devices field to update borders of the one or more suspicious areas of the explosive devices at the explosive devices field;
a visual sensor to provide an image of the explosive device;
a magnetic field sensor to sense metals;
a hyperspectral camera to sense explosives based on a reflected emission from a ground surface;
a ground penetrating radar to provide data related to the explosive devices at the one or more suspicious areas of explosive devices; and
a data communication device to provide discovered explosive data to the processing device.

15. The product of claim 13, wherein the data types comprise one or more global data types which comprises at least one of:
environment data, administrative boundaries data, geopolitical data, population data, anthropology data, conflict zone data including time and date of the conflict data and military data.

16. The product of claim 13, wherein the one or more data types comprises one or more static data types which comprises at least one of:
one or more satellite photos of the explosive devices field, one or more aerial photos of the explosive devices field, one or more schematic drawings of the explosive devices field and one or more maps of the explosive devices field.

17. The product of claim 13, wherein the one or more data types comprises one or more dynamic data types which comprises at least one of:
Light Detection and Ranging (LIDAR) data of the explosive devices field, hyperspectral data of the explosive devices field, electromagnetic data of the explosive devices field and three-dimensional (3-D) model of the explosive devices field.

18. The product of claim 13, wherein the program instructions, when executed include analyzing instructions comprising:
collecting data from the one or more global databases, one or more local databases and the AV to provide collected data;

storing the collected data at a storage device;
fusing the collected data to provide a fused map layer;
visually analyzing the fused map to provide visual data;
providing a location of one or more suspicious areas of explosive devices at the explosive devices field;
predicting a level of danger of the one or more suspicious areas; and
classifying the one or more suspicious areas based on the level of danger.

19. The product of claim 13, wherein the program instructions, when executed generate the one or more datasets instructions comprising:
generating at least one of: a threats dataset, classification of risk zones dataset and a polygon dataset, wherein the classification of risk zones dataset comprises a red table based on the CHA class to predict a highest level of danger area, an orange table based on the SHA class to predict a middle level of danger area and a green table based on the NHA class to predict a low level of danger area.

20. The product of claim 13, wherein the AV is at least one of a bagger and a drone configured to detect and to neutralize the one or more explosive devices.

\* \* \* \* \*